UNITED STATES PATENT OFFICE.

HENRY LIVINGSTONE SULMAN AND HUGH FITZALIS KIRKPATRICK PICARD, OF LONDON, ENGLAND, ASSIGNORS TO THE METALS EXTRACTION CORPORATION LIMITED, OF LONDON, ENGLAND.

EXTRACTION OF LEAD FROM ITS ORES OR LEAD-CONTAINING MATERIALS.

1,265,547.   Specification of Letters Patent.   Patented May 7, 1918.

No Drawing.   Application filed June 28, 1917.   Serial No. 177,599.

*To all whom it may concern:*

Be it known that we, HENRY LIVINGSTONE SULMAN, metallurgist, and HUGH FITZALIS KIRKPATRICK PICARD, metallurgist, subjects of the King of England, residing at London, England, have invented certain new and useful Improvements in the Extraction of Lead from Its Ores or Lead-Containing Materials, of which the following is a specification.

This invention relates to the extraction of lead from its ores or lead-containing materials.

We are aware that it has been proposed to use strong sodium chlorid solution for the purpose of dissolving lead sulfate from mixtures containing it, but we have found that, although in the first instance the removal of the lead may be effected by such a solution, the liquors resulting after the removal of the lead can not again be used on a fresh quantity of lead-containing material with equal efficiency, owing to the presence of the sodium sulfate produced, which adversely affects the dissolving power of the brine for lead sulfate.

According to the present invention a process for the extraction of lead from its ores or lead-containing materials when the lead is in the form of lead sulfate, and in which brine is used to dissolve the lead sulfate is characterized by the employment with the brine of a solution of a salt, such as calcium chlorid, capable of forming a sulfate substantially insoluble in brine.

The brine should be in the form of a hot saturated solution of common salt in water.

It is necessary for our purpose that the lead to be extracted should be in the form of lead sulfate, and if it is not in this form it must be treated to convert it to the sulfate. Thus our process is specially suitable for ores which contain lead sulfate as a mineral, or for industrial or metallurgical products wherein the lead is contained as sulfate or can be readily converted into sulfate.

For reasons of economy it is desirable to be able to use the brine for successive charges, and this object is realized by the addition of a salt such as calcium chlorid, which is capable of forming a sulfate insoluble in brine, in quantity equivalent to the lead sulfate to be dissolved, whereby, by double decomposition, calcium sulfate is formed and precipitated, and lead chlorid passes into solution, no sodium sulfate being produced.

It is desirable to avoid the employment of an excess of calcium chlorid, *i. e.* not to use a quantity larger than is required for the lead to be dissolved, especially if it is wished to recover the lead as carbonate, as mentioned below, for the reason that any excess of calcium chlorid would be precipitated with the lead carbonate and would render the latter impure. Under these conditions the extracting brine solution can be used an indefinite number of times if the lead chlorid therein contained be periodically removed by precipitation with sodium carbonate, sodium sulfid, lime, or by other suitable means. Hence in the process according to this invention no salt is consumed.

A sufficiency of brine must be used to secure complete solution of the lead sulfate; thus in practice it has been found that the resulting solution will not contain more than 3% of lead, and the volume of the leaching solution must be adjusted accordingly; after the lead has been dissolved the solution is separated from the residues by settling or filtration. The residues will contain the gangue and other insoluble matter together with the precipitated calcium sulfate. In place of adding the necessary quantity of calcium chlorid to the original brine solution, the latter, if desired, may be used to extract the lead sulfate direct, and after separation of the liquor from the residues, calcium chlorid is employed to decompose the sodium sulfate—the precipitated calcium sulfate being removed by filtration, etc., before precipitating the lead. Similarly in this modification of our process the sodium chlorid entering into the reaction is regenerated.

In precipitating the lead as carbonate for example, an excess of the precipitant must be avoided, as any such excess would remain in the liquor circuit and render insoluble its equivalent of lead in the treatment of the next charge.

When lime is used to precipitate the lead from its chlorid solution calcium chlorid is regenerated, the lead being precipitated as hydrate, and in such case the equivalent addition of calcium chlorid to the next charge is unnecessary.

One method of carrying out our process on an ore containing sulfate of lead will now be described. The ore is finely ground and is then agitated with sufficient brine solution containing the required quantity of calcium chlorid, at a temperature of about 70-90° C., for say 30 minutes. We have found this time sufficient to extract the lead from an ore-product containing 33% of lead sulfate in a suitably fine condition.

The lead chlorid and brine solution is then separated by filtration or settling from the calcium sulfate and residues. If the residues contain other valuable constituents such as gold or silver, these may then be recovered by suitable means.

If it is desired to recover the lead as carbonate, solid dry carbonate of soda in powder is then stirred into the solution. This preference for the solid is in order to avoid increase in the volume of the leaching solution, which otherwise would necessitate evaporation to the normal working volume. After precipitation of the lead the brine solution is separated as by filtration, a further quantity of calcium chlorid is added to it, and it is used for the treatment of a fresh quantity of ore.

If, however, lime be the precipitating agent employed, calcium chlorid is regenerated, and further addition to the solutions of this material (corresponding to the amount regenerated) is unnecessary, the lead in this case being precipitated as hydrate.

Whether the precipitating agent be carbonate of soda or lime it is found in practice that a certain proportion of the lead is precipitated as chlorid, and it is desirable to convert this chlorid into oxid or carbonate before the further operation of converting the precipitate by smelting to metallic lead, if metallic lead be the ultimate object sought for. This may be accomplished by digesting the precipitate in a hot solution containing either lime or carbonate of soda until the conversion be completed. If this operation be conducted by means of lime, calcium chlorid is again regenerated, and it can be used in the process as described above. Alternatively the precipitate containing chlorid of lead may be smelted in the presence of lime or carbonate of soda and carbon, with such addition of flux as may be necessary.

Should the material to be treated contain sulfate of zinc, zinc chlorid will similarly pass into solution in the brine, but we have found that the separation of lead from zinc can be accomplished with practical completeness by fractional precipitation with carbonate of soda, all the lead being precipitated first as carbonate of lead, the zinc carbonate only being thrown down after sufficient sodium carbonate has been added to satisfy all the lead. The carbonate of soda additions can therefore be adjusted to precipitate carbonate of lead free from zinc, in the first place, and thereafter to throw down zinc carbonate.

Our invention is particularly applicable to the treatment of refractory ores which contain as the chief valuable constituents lead, zinc, and silver, which, for the purpose of this description, may be considered originally to be present as sulfids. In such cases the ore would be submitted to a sulfatizing roast with the object of oxidizing the sulfids and converting as much of the base metals as is economically desirable into sulfates. The roasted ore is then leached with water, or if base metal oxids or silicates are present, with dilute sulfuric acid, whereby the zinc is dissolved as sulfate, and any oxidized lead not already in the form of sulfate is converted into this salt.

The solution containing the zinc is separated by filtration from the remainder of the ore and is recovered by electrolysis or by other suitable means. The residues containing the lead as sulfate and the silver are then treated by the process above described for the recovery of the lead; and thereafter, the residues still containing silver (and gold if present) may be treated by cyanid or other means for the recovery of these metals. By the adoption of this process the difficulty of smelting finely divided residues containing sulfate of lead is avoided. The same process may be applied to ores containing lead in the absence of other valuable constituents, provided that the lead present can be converted to sulfate by roasting or by treatment with sulfuric acid.

If silver chlorid be present or be produced in the ore, etc., charge to be extracted and becomes soluble in the brine solution, the silver can be recovered therefrom by precipitation, either separately or with the lead.

In the following claims the term "lead-containing material" is to be understood to include lead ores.

What we claim as our invention and desire to secure by Letters Patent is:—

1. A process for the extraction of lead from lead-containing material when the lead is in the form of sulfate, which consists in treating the said material to dissolve the lead with brine and a solution of a salt capable of forming a sulfate substantially insoluble in brine.

2. A cyclic process for the extraction of lead from lead-containing material when the lead is in the form of sulfate, which consists in treating the said material to dissolve the lead with brine and a solution of a salt capable of forming a sulfate substantially insoluble in brine, precipitating the lead, separating the precipitate, and thereafter adding to the brine a further quantity of the said sulfate-forming salt and treating a fresh batch of lead-containing material therewith.

3. A cyclic process for the extraction of lead from lead-containing material when the lead is in the form of sulfate, which consists in treating the said material to dissolve the lead with brine and a solution of a salt capable of forming a sulfate substantially insoluble in brine, precipitating the lead with lime, separating the precipitate and treating a fresh batch of ore or lead-containing material with the solutions produced.

4. A process for the extraction of lead from lead-containing material when the lead is in the form of sulfate which consists in first dissolving the lead with brine and subsequently treating the resulting solution with a salt capable of forming a sulfate substantially insoluble in brine.

5. A cyclic process for the extraction of lead from lead-containing material when the lead is in the form of sulfate which consists in treating the said material with brine to dissolve the lead, then treating the resulting solution with a salt capable of forming a sulfate substantially insoluble in brine, precipitating the lead, separating the precipitate and treating a fresh batch of lead-containing material with the solutions produced.

6. A process for the extraction of lead from material containing lead and zinc as sulfate which consists in treating the said material to dissolve the lead with brine and a solution of a salt capable of forming a sulfate substantially insoluble in brine and separating any zinc dissolved by fractional precipitation prior to the precipitation of the lead.

7. A cyclic process for the extraction of lead from lead-containing material when the lead is in the form of sulfate which consists in treating the said material to dissolve the lead with brine and a solution of a salt capable of forming a sulfate, substantially insoluble in brine, precipitating the lead, separating the precipitate, adding to the brine a further quantity of the said sulfate-forming salt, treating a fresh batch of lead-containing material therewith, and treating the lead precipitate to render any chlorinated compounds of lead present non-chlorinated.

8. A cyclic process for the extraction of lead from lead-containing material when the lead is in the form of sulfate which consists in treating the said material to dissolve the lead with brine and a solution of a salt capable of forming a sulfate substantially insoluble in brine, precipitating the lead, separating the precipitate, adding to the brine a further quantity of the said sulfate-forming salt, treating a fresh batch of lead-containing material therewith, treating the lead precipitate by digesting it with a hot solution of lime, and employing the solutions produced in the treatment of a fresh batch of lead-containing material.

9. A process for the extraction of lead from lead-containing material when the lead is in the form of sulfate which consists in treating the said material to dissolve the lead with brine and a solution of calcium chlorid.

10. A cyclic process for the extraction of lead from lead-containing material when the lead is in the form of sulfate which consists in treating the said material to dissolve the lead with brine and a solution of calcium chlorid, precipitating the lead, separating the precipitate and thereafter adding to the brine a further quantity of calcium chlorid and treating a fresh batch of lead-containing material therewith.

11. A cyclic process for the extraction of lead from lead-containing material when the lead is in the form of sulfate which consists in treating the said material to dissolve the lead with brine and a solution of calcium chlorid, precipitating the lead with solid dry sodium carbonate, separating the precipitate, and thereafter adding to the brine a further quantity of calcium chlorid and treating a fresh batch of lead-containing material therewith.

In testimony whereof we have signed our names to this specification in the presence of two subscribing witnesses.

HENRY LIVINGSTONE SULMAN.
HUGH FITZALIS KIRKPATRICK PICARD.

Witnesses:
GEORGE YARHAM,
ERNEST W. MOSES.